Figure 1:
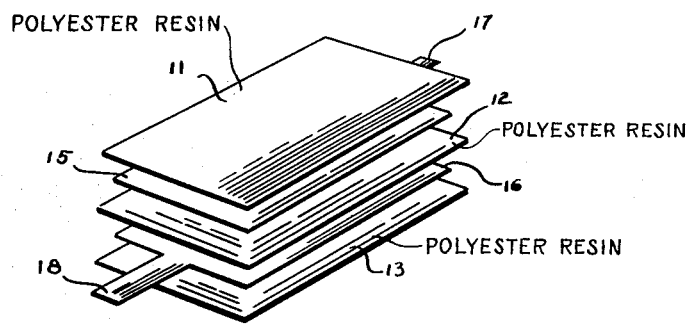

DAVID B. PECK
PRESTON ROBINSON
INVENTOR

BY *Arthur G. Connolly*

THEIR ATTORNEY

United States Patent Office 2,764,718
Patented Sept. 25, 1956

2,764,718
ELECTRICAL CONDENSERS

David B. Peck and Preston Robinson, Williamstown, Mass., assignors to Sprague Electric Company, North Adams, Mass., a corporation of Massachusetts Application December 28, 1951, Serial No. 263,866

7 Claims. (Cl. 317—258)

This invention relates to new and improved stacked condenser sections, and to methods of manufacturing these sections. This application is a continuation-in-part of our copending applications Serial No. 118,198, filed September 27, 1949, now U. S. Letters Patent 2,738,453, granted March 13, 1956, and Serial No. 204,546, filed January 5, 1951. Reference is made to our closely related copending applications Serial Nos. 237,049 and 237,050 which were filed July 16, 1951, now U. S. Letters Patent 2,735,970, granted February 21, 1956, and U. S. Letters Patent 2,740,732, granted April 3, 1956, respectively.

According to various prior methods, a great variety of materials have been used in conjunction with electrodes to form stacked condenser units. Condenser sections formed in the known manners have had any of several general drawbacks. Either they have been limited in the application because of their cost, and/or the dielectric properties of the spacer materials used, such as low corona starting voltage, or because they required bulky protecting casings.

It is an object of this invention to overcome these and related difficulties and disadvantages of the prior art. Another object of this invention is to produce stacked condenser sections which have superior dielectric properties, and do not require bulky external casings. These and other objects will be seen from the appended specification and claims.

The foregoing objects are obtained by virtue of the discovery that planar molecularly oriented linear thermoplastic polyester films conforming to the recurrent formula:

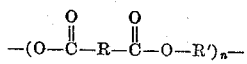

in which R stands for a bivalent radical containing the benzene nucleus and R' stands for a bivalent aliphatic radical containing from 2 to 8 carbon atoms which can be used as dielectric spacers in stacked condenser units possessing superior properties. The present invention involves forming these condenser units in such a manner that there is no shrinkage of the active dielectric in the plane of molecular orientation.

In one modification of this invention, stacked units using dielectrics as indicated above are formed into a unitary mass by the application of heat at a series of points around the periphery of a stacked condenser unit. The heat required must be sufficient to fuse the various polyester layers to one another at the various points at which it is applied. Any molecular disorientation that results is limited to areas where the dielectric stress is low.

In a second embodiment of the invention stacked condenser units formed with planar molecularly oriented dielectrics, as indicated above, are fashioned into a single unitary mass by the application of heat and pressure to the stacked unit in such a manner that the molecular orientation of the dielectrics around the periphery of the unit is at least partially destroyed, and the dielectrics are fused to one another throughout all points around the periphery of the unit. The heat required for the second embodiment of the invention must be beyond the disorienting temperature of the polyester dielectric used, and the pressure employed must be sufficient to prevent any shrinkage of the dielectric in the planar direction. Thus, the shrinkage which occurs is in the vertical or thickness plane between the electrodes. Units formed in accordance with the initial embodiment may be further treated as indicated in this paragraph.

Figure 2:
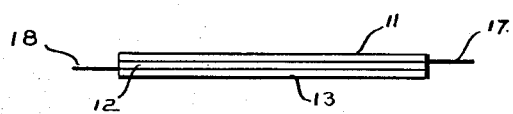

For purposes of illustration reference is made to the accompanying drawings in which Fig. 1 shows an expanded view of parts going into a simple stacked condenser; and in which Fig. 2 shows a side view of a stacked unit employing these parts.

As shown in the drawings the polyester sheets 11, 12 and 13 separate electrode foils 15 and 16. Appropriate tabs 17 and 18 attached to these foils project from opposed ends of the capacitor. When the indicated parts are positioned with respect to one another as indicated in Fig. 2, they may be treated in accordance with either of the modifications of the invention indicated above.

The preferred polyester used in accordance with this invention is a linear condensation polymer of terephthalic acid and ethylene glycol sold under the trade name "Terylene." A film of this resin reduces normally in area from 2% to 20% when heated at temperatures of from 165° C. to 218° C., the amount depending upon the polymer size and the degree of initial molecular orientation. When processed according to the embodiment above noted, this shrinkage may take place in the vertical direction. Other acceptable polyesters conforming to the above noted general formula are the condensation polymers of terephthalic acid and its substituted derivatives and various alkane diols such as propylene glycol, butylene glycol, pentamethylene glycol, hexamethylene glycol or heptamethylene glycol and other condensation polymers of the chlorinated or otherwise substituted dibasic aromatic acids with substituted and unsubstituted glycols. It is preferred to employ starting materials which will condense to form a linear, readily oriented chain. Thus p-substituted aromatic compounds are preferred to meta or ortho substituted compounds. The desired planar orientation may be accomplished by stretching the film in the two planar directions at a temperature below its relaxation or transition temperature.

Condenser units as indicated in the first of these modifications of the invention may be conveniently formed into a unitary body by applying any hot tool to the edge of the unit removed from the electrode foils. No particular pressure is required in the average situation where very thin electrode foils are used. Edge fusion may also be accomplished by the application of a flame or hot gas. With Terylene films as the polyester spacers, temperatures of at least 218° C. are satisfactory in fusing the edges of a unit together. With this polyester and other polyesters, temperatures above the transition point of the resin are necessary. A 2" x 6" stacked condenser employing seven 1½" x 5½" one mil copper electrodes, spaced within the edges of eight one mil Terylene polyester dielectric sheets has been conveniently fused into a unitary mass by the application of a soldering iron heated to 250° C. at the four corners of the unit.

Condenser units formed in accordance with the second modification of this invention are advantageous in that they are completely sealed around their peripheries by the fused polyester spacers. In general, the same temperatures above their transition points indicated above are required with this type of treatment. Pressures vertical to the plane of the film of from 100 to 10,000 pounds per square inch are applied to these condenser sections simultaneously with the application of heat. A governing condition as to pressure required, is that the pressure must be sufficient to prevent any wrinkling of the polyester spacers due to shrinkage of these spacers in the plane of their molecular orientation. At these temperatures there is some tendency to shrink in a non-planar direction.

Condenser sections of this variety have been prepared using 3" x 2 5/16" rectangles of 5 mil Terylene films covering 3 sheets of 1 mil copper foil 1¼" wide, the foils of opposite polarity projecting from the opposite short ends of the unit, said foils having a 2" overlap. These units were clamped tightly under 500 pounds per square inch, against the top and bottom of the stack, that is, in a direction perpendicular to the film plane, placed in an oven at 218° C. for 1 hr., and then allowed to cool slowly. They had a capacity of .00172 mfd., low power factor, and a high corona starting voltage. When subjected to a 14 kilovolt D. C. breakdown check, they did not break down.

Obviously the exact temperatures, times and pressures required with either of the modifications of this invention will vary in accordance with the specific dielectric used, and the thicknesses of the various layers employed. It is entirely within the skill of the art to determine such temperatures and pressures for any given stacked condenser section. With certain units it is desirable to apply pressure on the area covered by the electrode layer before applying pressure to the area not covered by the electrodes during the heating step.

Such sections may be formed in any of the conventional manners at present known to the art, and the invention herein described is not to be considered as limited to either a rectangular or square unit employing any given type of terminal tab.

If it is not desired to use separate electrode foils, metallized layers may be created upon the dielectric spacers herein indicated, or upon other dielectric media which may be used in connection with them. The polyester dielectrics described in this invention may be used in stacked condenser units with other dielectric materials such as oil impregnated paper, polystyrene, n-vinyl carbazole, pentachlorostyrene, and other thermo-plastic resins and the like.

Those units formed with thermoplastic sheets of dielectric material whose softening point is at least 20° C. below the transition temperature of the polyester resin supplementing the polyester sheets of this invention are particularly desirable because of their resistance to corona effects at their edges. During the heating step these thermoplastic sheets flow towards the outside of the units and completely fill any voids present. To assist in this step, the unit is preferably held under reduced pressure (vacuum) throughout the heating process. Thus, 2 5/16" x 3" stacked units formed with 5 mil Terylene sheets separated from 3½ mil copper foils by 9/10 mil polystyrene layers by placing the stacked components under 500 pounds per square inch pressure above 218° C. for a period of one hour had excellent properties. The capacity of these units was .00130 mfd. They had a low power factor, a corona starting voltage of 4500 v., and withstood a 15 kv. D. C. breakdown check.

Frequently it is desirable to dip or impregnate the edges of stacked units which are subjected to the pressure molding operation in oil in order to gain additional protection against corona effects before they are subjected to heat and pressure.

According to a limited embodiment of the invention, capacitors which do not have their edges completely fused are impregnated with oil, wax or resin by the sequential process of subjecting the capacitors to reduced pressure at temperature substantially below the relaxation temperature, introducing the impregnant in liquid state, then optionally increasing the pressure to atmospheric, and finally, raising the temperature to a value substantially in excess of the relaxation temperature of the polyester. If polymerizable impregnants, such as polyesterstyrene mixtures, n-vinyl carbazole, diallyl phthalate etc., are employed, the thermal treatment can be used also to polymerize these materials into the hard, resinous state.

This invention is broader than any of the embodiments specifically set forth herein, and is to be limited only by the scope of the appended claims.

As disclosed in our patent application the polyester resins discussed herein may be combined with glass, mica and other inorganic dielectric materials to produce composite dielectrics with exceptional thermal stability. For example the polyester resin may be mixed with flake mica and/or fibrous glass prior to extrusion. Even if the mica and/or glass fibers are not oriented in the plane of direction at the point of extrusion (and chances will favor proper orientation) the stretching process normally applied to the resin film will also convert the glass fibers or mica plate disposition to predominantly the plane of resin orientation. The resulting product will not be subject to thermoplastic flow at elevated temperatures to the extent of the normal 100% resin and can even be operated under special conditions above the melting point of the resin. Alternately the glass fiber matte, paper or cloth or a mica flake paper may be used with the resin film in a hot pressing or calendering operation to effect impregnation of the pores and interstices of the inorganic layer with resin. The flow of the resin into the inorganic layer may be accomplished prior to construction of the capacitor or actually accomplished in much the same manner as previously described for 100% resin film; that is, with pressure being applied so that the resin film shrinkage is not in the planar direction. It is also to be understood that other resins such as polytetrafluoroethylene may be included in the composite dielectrics above described.

What is claimed is:

1. A process for preparing capacitors, including the steps of stacking electrode layers with intervening dielectric layers to form a stacked capacitor assembly in which between every pair of adjacent electrode layers there is a layer of planar oriented linear polyester conforming to the recurrent formula:

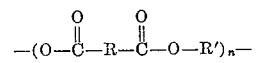

wherein R represents a bivalent radical containing the benzene nucleus, and R' represents a bivalent aliphatic radical containing from 2 to 8 carbon atoms, and the polyester layers project beyond the electrode layers, and subjecting the stacked assembly to a temperature high enough to cause the projecting portions of the polyester layers to disorient and become adhered together, while subjecting the assembly to a sandwiching pressure great enough to keep the polyester layers from appreciable planar disorientation in the interelectrode regions.

2. The process of claim 1 in which the linear polyester is polyethylene terephthalate.

3. The process of claim 1 in which the polyester layers are paired with layers of thermoplastic resin having a softening point at least 20° C. lower than the disorienting temperature of the polyester.

4. The process of claim 3 in which the thermoplastic resin is polystyrene.

5. An integral stacked capacitor section having electrode layers separated by layers of oriented polyester resin conforming to the recurrent formula:

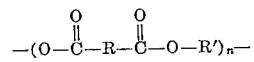

wherein R represents a bivalent radical containing the benzene nucleus, and R' represents a bivalent aliphatic radical containing from 2 to 8 carbon atoms, said resin layers projecting beyond the electrode layers, the projecting edges being disoriented and fused together at a series of spots around the periphery of the section, and holding the section layers together.

6. The capacitor section of claim 5 in which the polyester resin is polyethylene terephthalate.

7. The capacitor section of claim 6 in which the polyester layers are paired with layers of polystyrene.

References Cited in the file of this patent

UNITED STATES PATENTS

| | | |
|---|---|---|
| 2,206,720 | Ducati | July 2, 1940 |
| 2,484,215 | Foster | Oct. 11, 1949 |
| 2,492,166 | Marco | Dec. 27, 1949 |
| 2,497,376 | Swallow | Feb. 14, 1950 |
| 2,593,829 | Arledter et al. | Apr. 22, 1952 |
| 2,607,825 | Eisler | Aug. 19, 1952 |
| 2,619,443 | Robinson | Nov. 25, 1952 |